Dec. 16, 1969    W. L. BOND ET AL    3,484,721
X-RAY LASER
Filed April 11, 1967    3 Sheets-Sheet 1
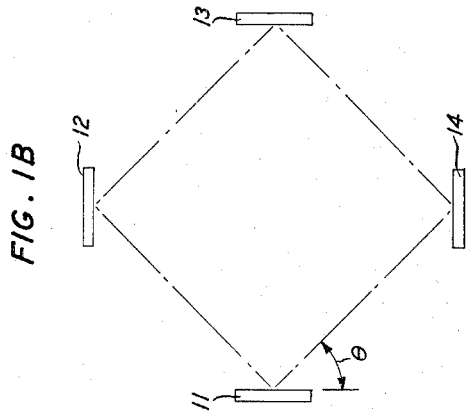
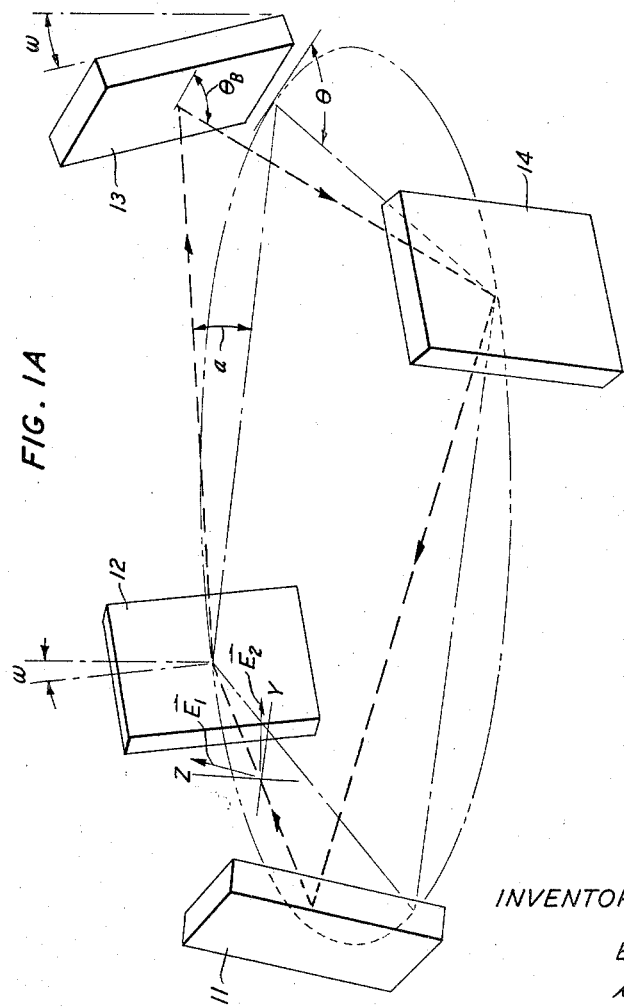
INVENTORS: W. L. BOND
M. A. DUGUAY
P. M. RENTZEPIS
BY
ATTORNEY

TABLE I

| GEOMETRY | CRYSTAL | PLANE | BRAGG ANGLE | θ | DETUNING ANGLE | ∝ | % LOSS PER REFLECTION |
|---|---|---|---|---|---|---|---|
| SQUARE | Ge | 333 | 45.0265° | 45.00° | 0.0265° | 1.74° | 0.37 |
| OCTAGON | Ge | 220 | 22.6486° | 22.50° | 0.1486° | 2.66° | 0.86 |
| SQUARE | Si | 333 | 47.4749° | 45.00° | 2.4749° | 17.09° | 17 |
| OCTAGON | Si | 220 | 23.6508° | 22.50° | 1.1508° | 7.48° | 6.6 |
| 8 POINT STAR | Si | 531 | 68.4436° | 67.50° | 0.9436° | 16.28° | 4.7 |

Dec. 16, 1969    W. L. BOND ET AL    3,484,721
X-RAY LASER

Filed April 11, 1967    3 Sheets-Sheet 3

United States Patent Office

3,484,721
Patented Dec. 16, 1969

---

3,484,721
X-RAY LASER
Walter L. Bond and Michel A. Duguay, Berkeley Heights, and Peter M. Rentzepis, Millington, N.J., assignors to Bell Telephone Laboratories, Incorporated, Murray Hill and Berkeley Heights, N.J., a corporation of New York
Filed Apr. 11, 1967, Ser. No. 629,937
Int. Cl. H01s 3/09
U.S. Cl. 331—94.5   12 Claims

ABSTRACT OF THE DISCLOSURE

A laser device for operation in the X-ray region comprises a resonator of three-dimensional polygonal shape having Bragg angle reflections at the apices of the polygon. The laser is pumped by removing electrons from the innermost shelfs of atoms of the active medium in synchronism with generation of X-rays traveling in the active medium. Pumping energy is achieved by collisions of relativistic particles and laser beams or by laser beam impingement on X-ray emitting material.

---

BACKGROUND OF THE INVENTION

The optical maser, or laser, art has undergone a phenomenal growth in the few years of its existence. There are today innumerable types of lasers producing a wide range of optical frequencies, and equally as numerous proposed uses for the laser output.

One particularly promising use for laser, i.e., coherent, light is in the production of true three-dimensional representations or pictures, known as holograms. A hologram is an instantaneous picture of the wave front reflected from a scene illuminated by laser light. When viewed under proper lighting conditions, this wave front picture reproduces the original three-dimensional scene, complete with parallax.

Another particularly interesting use for the laser beam is as a therapeutic device. The coherent laser light can be focused such that its energy is concentrated onto a very small area. This property makes possible numerous medical applications, such as, for example, retinal welding and cauterized incisions.

It has been recognized that the utility of such arrangements as mentioned above would be greatly enhanced if lasers could be made that generate X-rays. For example, an X-ray hologram would obviously have wide utility in the medical field. Equally as important, if not more so, an X-ray holographic system would make it possible to depict protein molecules in three dimensions, which would greatly facilitate the study of such molecules. An X-ray laser would also make it possible to produce an extremely intense small area X-ray beam for the treatment of, for example, tumors within the body.

To date a feasible X-ray laser has not been produced, primarily because of two factors. The Bragg angle, at which maximum reflectivity of X-rays occurs, is not, in general, a submultiple of 180° or 360°, hence an X-ray laser cavity resonator has thus far been extremely difficult to construct. In addition, the powers required to pump an X-ray lasing medium are extremely large under ideal conditions. With the losses introduced due to the use of angles other than the Bragg angle, they are even greater, and are impractical.

SUMMARY OF THE INVENTION

The present invention is an X-ray laser which overcomes the two major problems set forth.

An X-ray cavity resonator is formed by "puckering" a normally planar ring type resonator into a three-dimensional polygon with crystals at each apex set at the Bragg angle appropriate to the particular X-ray wavelength and crystal parameters involved, relative to the plane of incidence of the X-ray beam. Each leg of the resonator connecting the apices is "puckered" by an angle α and each crystal is tilted so that the normal to its face lies in the plane defined by the two legs meeting at the apex. Consecutive crystals are tilted alternately toward and away from the center of the resonator, and the angle α controls the value of the angles of incidence and reflection. As a consequence, α can be made such that the Bragg angle condition is satisfied at each crystal face for the particular X-ray frequency, although a projection of the resonator onto a plane would have apex angles different from the Bragg angle.

In an illustrative embodiment of the invention, a member containing an X-ray active medium is placed within the resonator extending along one leg between neighboring crystals. The medium is excited by a plurality of laser beams focused to points along the length of the member and impinging upon a suitable material, such as copper foil closely adjacent the member. The high energy photons of the beams striking the foil produce high power X-ray radiation through collisions with electrons in the foil which radiation excites the active medium in a manner to be explained more fully hereinafter to produce X-ray laser action. The lasers are pulsed sequentially to produce a synchronous or traveling wave type of pumping. An alternative form of pumping makes use of the collision of photons from an array of lasers with relativistic particles from an accelerator which produces high power X-ray radiation to excite the active medium. As with the first pumping arrangement the lasers are pulsed in synchronism with the X-ray pulse generated in the active medium.

DESCRIPTION OF THE DRAWING

FIG. 1A is a perspective view of a resonator of the present invention;

FIG. 1B is a plan view of the resonator of FIG. 1A projected onto a plane;

DETAILED DESCRIPTION

Figures 2, 3:
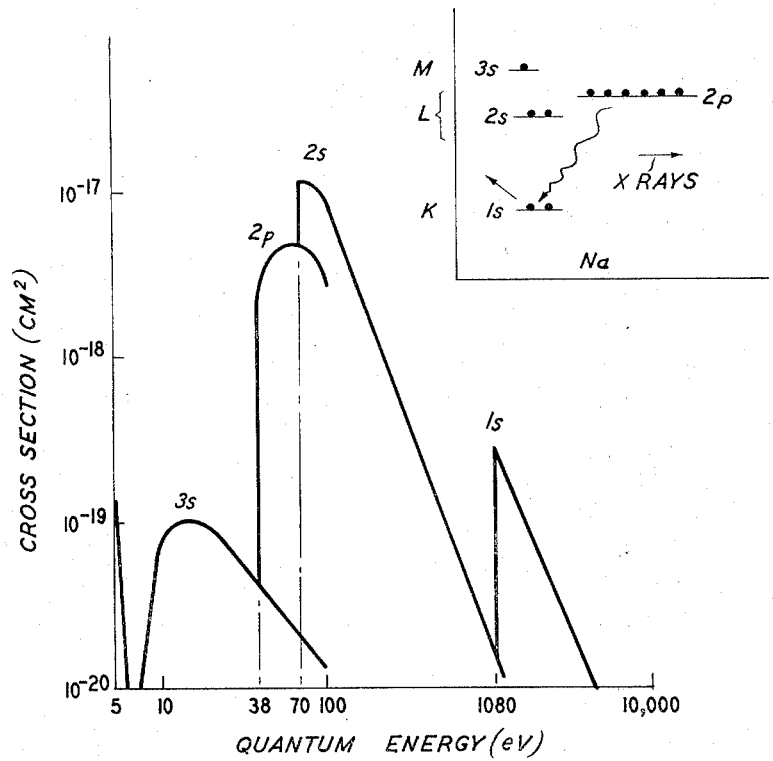
FIG. 2 is a table giving the value of certain parameters of the resonator of FIG. 1A for different configurations and materials.
FIG. 3 is a graph of the excitation cross section for sodium.

Ordinary reflectors as used in optical masers are useless at X-ray wavelengths because their reflectivity is essentially zero. Such reflectors can be made to reflect X-rays if the angle of incidence is no more than a grazing angle, e.g., 20 minutes. Thus the construction of a resonator for X-ray wavelengths with such reflectors would require something of the order of a thousand mirrors for a ring type resonator.

On the other hand, X-rays incident upon a crystal face at the Bragg angle, which is given by $$\sin\theta = \frac{n\lambda}{2d} \quad (1)$$

where $\theta$ is the Bragg angle, $\lambda$ is the X-ray wavelength, $n$ is an integer, and $d$ is the spacing of the planes or layers of atoms in the crystal, is 99% or more reflected for an electric vector approximately parallel to the Bragg planes. Unfortunately, the Bragg angle is very precisely defined, and only in extremely rare instances is it a submultiple of 360°. As a consequence, it is extremely difficult to produce the closed path required for a resonator.

The present invention makes it possible to produce a closed path, and hence a resonator, while retaining the high reflectivities of the Bragg angle. In FIG. 1A there is shown an arrangement in accordance with the principles of the invention which constitutes a resonator. The arrangement of FIG. 1A comprises four crystals 11, 12, 13 and 14 of suitable material such as, for example, germanium or silicon, the reflecting face of each preferably, although not necessarily, parallel to the Bragg planes. The crystals are located at the four apices or corners of what would be a square if projected onto a plane, as shown in FIG. 1B, but which, in FIG. 1A, is a three-dimensional figure depicted by the heavy dashed lines. These dashed lines also represent the path that the X-rays follow within the resonator. Each leg of the resonator is "puckered," i.e., differs from the horizontal, by an angle $\alpha$, as shown, and each crystal is tilted about a tangent to the circumscribed circle by an angle $\omega$ until the normal to the reflecting face lines in the plane defined by the "puckered" legs incident upon the face, as shown in FIG. 1A. Consecutive crystals are tilted alternately toward and away from the center of the circle, as shown, inasmuch as the planes defined by the connection of the "puckered" legs alternately tilt up and down.

It can be shown that the angle $\theta_B$ of incidence and reflection on the crystal faces is related to the angle $\theta$, which is the angle of incidence projected onto a plane, as seen in FIG. 1B, by $$\cos \theta_B = \cos \alpha \cos \theta \quad (2)$$

For the arrangement shown in FIGS. 1A and 1B, $\theta$ is 45°, and varying the angle $\alpha$ from 0° to 15° causes $\theta_B$ to vary from 45° to 46.9°. For resonators of different configurations, such as, for example, hexagon, octagon, or star shape, the same conditions apply. Thus, for a hexagonal resonator, $\theta$ is 30°, and varying $\alpha$ from 0° to 20° varies $\theta_B$ from 30° to 35.5°. The corresponding X-ray wavelength variation, from Equation 1 for $n=1$ and $d=3.14$ A., would be from 3.14 A. to 3.60 A.

With the arrangement as shown in FIGS. 1A and 1B, some losses occur because that component of the electric field vector of the X-rays lying in the plane of incidence is not reflected as efficiently as the component normal to that plane. These losses can be minimized by keeping the angle $\alpha$ small, but this places some restriction on the degree of tunability through variation in $\alpha$. In constructing a resonator, it is possible to use several different crystals, each having its own characteristic Bragg plane spacing, thus making it possible to produce an irregular polygonal shape having a total deflection angle of nearly 360°, then to tune by varying $\alpha$ to produce a closed path. In this way $\alpha$ may be kept small. It is also possible, in the interests of keeping $\alpha$ small to insert within the resonator one or more smooth flat metal members to reflect the X-rays at a grazing angle of, for example, 0.3 degree. This provides a few degrees of tuning, making it possible to keep $\alpha$ smaller than would ordinarily be the case.

It is also possible to reduce radiative losses by curving the reflecting surface of one or more of the crystals. In addition, irises may be introduced to limit the number of modes. Power can be coupled out of the resonator in any one of a number of suitable ways, such as by having a small hole in one crystal, or having one very thin crystal so that it is partially transmitting, or by the Borrmann effect.

In Table I of FIG. 2 there are listed some specific examples of geometries and crystals, and the associated parameters for an X-ray laser operating on the copper $K\alpha_1$ line, assuming high quality crystals. From Table I it can be seen that the germanium square is an excellent choice for this X-ray wavelength. The detuning angle given in Table I is simply the difference between the Bragg angle $\theta_B$ and its projection on a plane as angle $\theta$. The polarization losses given in Table I are calculated from the formula $$\text{Loss per mirror} = 8\Delta \tan \theta \quad (3)$$

where $\Delta$ is the detuning angle. This holds for small values of $\alpha$.

The pumping of lasers of extremely short wavelengths such as, for example, vacuum ultraviolet (2000 A. or less) as well as X-ray, ordinarily requires very high pumping powers because of the short lifetimes of the atomic states suitable for laser action. For example, the lifetime of a $k$-shell hole in germanium is about $10^{-15}$ seconds, and the energy required to produce such a $k$-shell hole is of the order of 10 kev. The pumping power required to maintain a population of atoms with $k$-shell holes is, therefore, of the order of one watt per atom.

The present invention makes use of photo-ionization and traveling wave type pumping to achieve laser action at X-ray wavelengths. The principles are equally applicable to vacuum ultraviolet wavelength laser action also.

When an electron has been ejected from, for example, the $k$-shell of a copper atom, the residual copper ion is left in an excited state which can decay by virtue of an $L$-shell electron dropping down into the $k$-shell, emitting X-rays. Since there are initially no copper ions, the process of photo-ionization has created a population inversion in a single step.

Preferential ejection of electrons from inner shells of atoms is made possible from the very nature of the photo-ionization process. The probability of ejecting a tightly bound electron, at particular wavelengths, is larger than that for ejecting a more loosely bound electron by a large factor in both the X-ray and vacuum UV regions. In FIG. 3 there is shown the photo-ionization cross section of sodium vapor, in log-log scale. It can be seen that at 10 ev. the probability is that only a $3s$ electron will be removed by photo-ionization. On the other hand from 40 ev. to 70 ev., the probability is over a hundred times greater that a $2p$ electron will be removed than a $3s$. By the same token, at 1.08 kev. (8–9 kev. for copper), the probability that a $k$-shell ($1s$) electron will be removed is several times greater than that a $2s$ ($L$-shell) electron will be removed. When a $1s$ electron is removed, a $2p$ to $1s$ transition takes place within $10^{-15}$ seconds, emitting UV or X-ray radiation, depending on the material. It is clear, therefore, from an examination of FIG. 3 that the pump must have a rise time of the order of $10^{-15}$ seconds. If the rise time is longer, a sequential excitation of atoms occurs, with absorption or "poisoning" taking place. Furthermore, for useful results, it is necessary to excite a large number of atoms, e.g. $10^7$ atoms, simultaneously, which requires a pump power of approximately $10^9$ watts. Thus, for laser action in the 8 kev. $L$-shell to $k$-shell transition in copper, the pump should be an X-ray source providing quanta from about 10–15 kev. at 1–2 gigawatts power.

Figure 4:
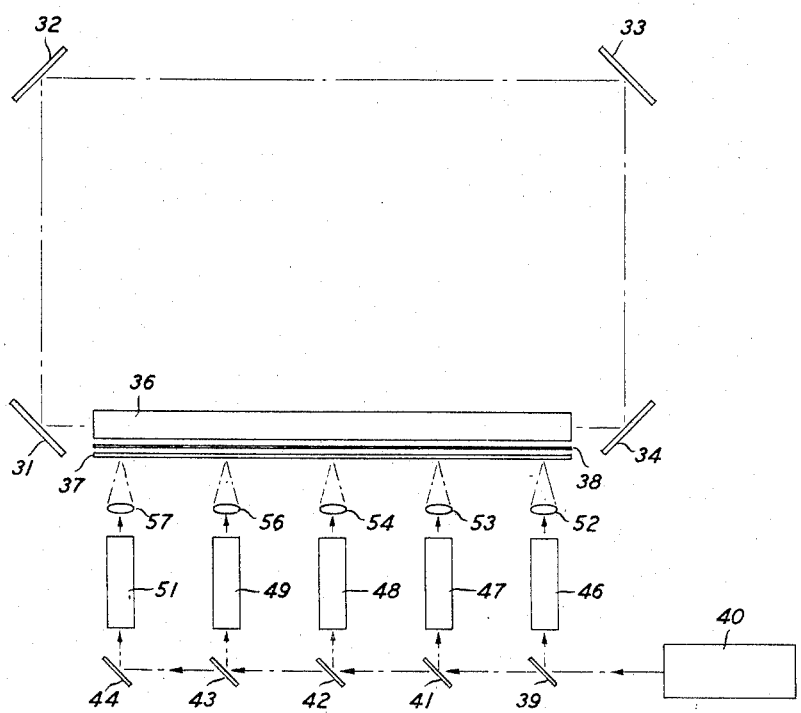
FIG. 4 is a schematic view of a laser of the present invention.

In FIG. 4 there is shown an X-ray laser utilizing the principles of the present invention and satisfying the criteria set forth in the foregoing. In particular, the pumping arrangement of FIG. 4 makes use of the fact that in pulse type operation it is not necessary to excite the entire active medium at the same time.

The arrangement of FIG. 4 comprises a resonator having mirrors 31, 32, 33, and 34, and constructed in accordance with the principles set forth in the discussion of FIG. 1. That is to say, the mirrors, i.e., crystals, are oriented to produce Bragg angle reflection at the X-ray wavelength of interest while at the same time providing a closed resonator path.

In one leg of the resonator is situated a member 36 of quartz or other suitable material containing the active medium, which, for purposes of the discussion, may be copper vapor. Closely adjacent member 36 is a member 37 of copper or other suitable material which, when subjected to intense laser light emits X-rays. A master laser oscillator 38 which may be any suitable laser, but preferably is of the neodymium-glass type having a very rapid rise time, is situated adjacent the resonator assembly. The output of laser 38 is directed toward an array of beam splitters 39, 41, 42, 43 and 44, each of which reflects a portion of the beam from laser 38 and transmits the rest, and which may take any one of a number of forms well known in the art. The reflected output of each beam splitter is directed into one of an array of laser amplifiers 46, 47, 48, 49, 51 which may be any of a number of types capable of producing high amplification at the output frequency of oscillator 38. The amplified output of each laser amplifier is focused by one of an array of lenses 52, 53, 54, 56 and 57 to a point on strip 37. When the high intensity beam impinges on copper strip 37, which is of the order of one micron thick (supporting means for the strip has been omitted for clarity), X-rays are emitted from the strip in the localized area of impingement. These X-rays excite the active medium locally adjacent the area of impingement on strip 37. In order that X-rays of the desired energy are used for excitation, a filter 38 of niobium foil or other suitable material may be used to filter out X-rays of lesser energy.

In operation, the X-rays generated by amplifier 46 and lens 52 excite the copper vapor in the desired manner, as discussed heretofore, thereby generating within the active medium an X-ray pulse of the desired frequency. As this pulse travels along the length of member 36, each succeeding laser-lens combination excites the medium in the area of the pulse, thereby enhancing it. As shown in FIG. 4, synchronism is achieved by virtue of the fact that both the X-ray pulse and the light from laser 38 travel at approximately the same velocities and in the same direction. Phase delays may be introduced in each of the arms containing a laser-lens combination so that synchronism may be achieved with alternate pulses, or however desired. The resonator functions in the manner described heretofore to produce numerous traversals of the active medium, and the coherent X-rays thus produced may be extracted as shown and as discussed heretofore.

The sequential excitation of local areas of the active medium in synchronism with the generated X-ray pulse materially decreases the power requirements of the X-ray laser, while insuring laser action. In addition, lasers such as the neodymium-glass laser have extremely short rise times, thereby eliminating or at least reducing the poisoning effect of sequential atomic excitation.

The number of laser amplifiers and hence areas of excitation may be varied to suit the needs of the system. In addition, suitable filters and diaphragms may be used in accordance with principles well known in the art to reduce the number of modes, where desired. Various other arrangements for generating the required number of laser beams may also be used without deviating from the basic pumping principle of FIG. 4.

Figure 5:
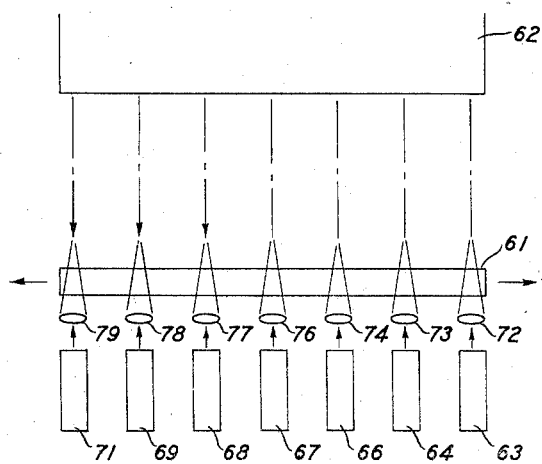
FIG. 5 is a schematic of an alternative pumping arrangement for a laser of the present invention.

In FIG. 5 there is shown an alternative pumping arrangement for the X-ray laser of FIG. 4. For simplicity the resonator, laser beam source, and beam splitter have not been shown. The arrangement of FIG. 5 comprises a container 61 of suitable material filled with copper vapor or other material capable of generating X-rays. One side of member 61 is a source 62 of relativistic particles, such as electrons. Source 62 may be, for example, a particle accelerator which produces either a sheet shaped particle beam, or a plurality of individual beams, directed as indicated by the arrows. An array of laser devices, either amplifiers or generators 63, 64, 66, 67, 68, 69 and 71 direct individual beams through focusing lenses 72, 73, 74, 76, 77, 78 and 79 toward the particles from sources 62 so that they collide closely adjacent member 61.

A head-on collision between relativistic particles and a laser beam produces a back scattering of photons whose energy is directly proportional to the energy of the laser beam and the square of the energy of the particles. Thus, when a 25 mega-electron-volt particle beam collides with a ruby laser beam of 1.78 electron volts, the energy of the back scattered photons is approximately 17.8 kilo-electron volts which is sufficient to remove $k$-shell electrons in copper.

As with the arrangement of FIG. 4, the pumping radiation occurs sequentially along the length of the member 61, in synchronism with the generated X-ray pulses, so that laser action is achieved.

As pointed out heretofore, the pumping arrangements are suitable for use in the generation of short wavelengths other than X-rays, such as, for example, vacuum ultraviolet rays. In addition, the pumping arrangements of both FIGS. 4 and 5 are capable of producing such high gains through superradiation that in some cases it is not necessary to use a resonator, although for optimum performance, the resonator should be used.

The foregoing discussion has been for purposes of illustrating the principles of the invention as applied to specific embodiments. Numerous other arrangements may occur to workers in the art without departing from the spirit and scope of the invention.

What is claimed is:

1. A laser device comprising a resonator having a plurality of reflecting members defining a closed path for energy at the laser frequency, said members being oriented so that the two legs of the path meeting at one of said members lie in a plane oriented at an angle to the plane defined by the legs meeting at the neighboring reflecting members, an active medium within said resonator, and means for pumping said active medium comprising means for sequentially exicting different portions of said active medium.

2. A laser device as claimed in claim 1 wherein said means for sequentially exciting said active medium includes means for exciting portions of the medium in synchronism with energy generated in and traveling through said medium.

3. A laser device as claimed in claim 1 wherein said means for pumping said active medium comprises means for generating X-ray radiation.

4. A laser device as claimed in claim 1 wherein the means for sequentially exciting different portions of the acting medium comprises a plurality of laser devices, the outputs of which are directed toward different regions of said active medium.

5. A laser device as claimed in claim 1 wherein the means for pumping said active medium comprises means for directing a plurality of laser beams to points adjacent the active medium and means for directing a stream of relativistic particles toward said points to produce collisions between said beams and said particles.

6. A laser device as claimed in claim 1 wherein the means for pumping said active medium comprises means for directing a plurality of laser beams to points along the length of a member adjacent the active medium, said member being of a material which emits X-rays upon impingement of a laser beam.

7. For use in a laser device, a resonator assembly comprising a plurality of reflecting members defining a plurality of angularly oriented paths for energy at the frequency of operation whose projections onto a plane form the sides of a closed polygon with a reflecting member at each apex, the plane defined by the paths of incidence and reflection at any one member being oriented at an angle to the corresponding plane of at least one other member.

8. A resonator assembly as claimed in claim 7 wherein the angle of incidence of the energy path at a reflecting member is given by $$\cos \theta_B = \cos \alpha \cos \theta$$

where $\alpha$ is the angle between the path of incidence and its projection onto a plane and $\theta$ is the projection of the angle of incidence onto the same plane.

9. A resonator assembly as claimed in claim 8 wherein the angle of incidence $\theta_B$ is the Bragg angle at the frequency of operation.

10. A resonator assembly as claimed in claim 7 wherein said reflecting members are germanium crystals.

11. A resonator assembly as claimed in claim 7 wherein said reflecting members are silicon crystals.

12. A resonator assembly as claimed in claim 7 wherein at least one of said reflecting members is of a different material than others of said reflecting members.

References Cited

UNITED STATES PATENTS 3,102,953   9/1963   Wallace.
3,433,568   3/1969   Skalski et al.

RONALD L. WIBERT, Primary Examiner
T. MAJOR, Assistant Examiner